Patented May 8, 1934

1,957,667

UNITED STATES PATENT OFFICE

1,957,667

CHIP-FLOW LATHE FOR HARD-METAL AND DIAMOND TOOLS

Malte Ritter, Walter Möbius, Otto Rothenberg, and Friedrich Wilhelm Block, Magdeburg, Germany Application June 14, 1932, Serial No. 617,100
In Germany December 28, 1931

9 Claims. (Cl. 82—2)

Owing to the invention of hard metal tools a revolution has taken place in the taking of cuttings. The lathes of known construction are not suitable for the thorough utilization of these cutting metals, as their construction does not meet the requirements placed thereon.

In order to explain the urgent necessity for suitably constructed machines for the purpose indicated, such as will be hereinafter described, the history of the improvements of lathes according to their purpose of use will be told hereafter.

The employment of ordinary carbon steel cutting tools requires only low cutting speed and low rate of feed. Consequently, it was not necessary when constructing a lathe to specially consider the safe operation and the quantity of chips removed.

Owing to the introduction of high speed steel tools the cutting speed could be considerably increased, but it was not yet necessary to take special precautions for the protection of the operator on the machine, as the springing off of chips is not dangerous at the relatively low revolving speeds.

For this working soft material for which higher speeds are employed the known goggles are sufficient. The quantity of cuttings and their removal presents no difficulties, so that the former construction of lathes can be considered as suitable.

In order to increase the efficiency of the high speed tool it is possible to very rapidly carry out the taking of cuttings with low cutting speed by simultaneously employing several tool edges, without endangering thereby the operator by the cuttings.

This method however often requires a long time for setting up, so that the employment of so-called multiple tool lathes is only advantageous for repetition work. Moreover, the removal of the quantities of chips cut is extremely difficult, owing to the arrangement of many tools side by side, and it very often happens that the cut chips jam between the cutting tools and that one or several of the tool edges are thereby prematurely destroyed. The work is thus likewise rendered useless.

Hard metal tool steels make it possible to obtain still greater outputs with single tools on ordinary machines by employing almost unlimited cutting speeds.

Consequently, it has been proposed to adapt existing ordinary lathes for working with hard metal tools by increasing the revolving speed. These makeshift lathes are called according to the known tool metals "Widia lathes" or "carbo-lathes". They are also called "light metal lathes", as these machines allow higher cutting speeds for the working of such metals.

If works having a small diameter are to be worked, the revolving speed must be exceptionally high according to an economical cutting speed. It must also be possible to centre between dead centres the works rotating at a very high speed and to clamp same tightly so that they cannot be flung out. Further provision must also be made for the personal safety of the operator by suitably guiding off the resultant masses of red-hot chips.

These requirements have hitherto not been met by any existing lathes, because the construction of the known lathes is not suitable, and none of the safety devices fitted by way of experiments are capable of sufficiently protecting the operator against serious injuries at such enormously high revolving speeds of the quantities of chips removed. Moreover, they render more difficult the working on such a machine.

It sometimes happens, that an operator on the machine and persons standing near must precipitately fly from the machine in order to escape injury from red-hot cuttings which are suddenly gripped by the work and flung around at an enormous speed. The explosive force of such balls of chips therefore renders it impossible to work with higher cutting speeds on such lathes which are unsuitable. Such experiments are always accompanied by great danger, and continuous turning under such conditions is legally prohibited.

Recent turning experiments with the tool metal have shown, that cutting speeds exceeding 1000 mtrs/min. can be attained. However, hitherto there existed no lathe, on which the most usual small pieces of work, such as shafts, bolts and the like, could be economically worked with correspondingly high revolving speeds whilst avoiding danger to life and taking into consideration the free flowing off of the cut off chip masses. The machine must be suitable for also working pieces of work of light metal under the same conditions, as at the economic cutting speeds also in this case the chips flung out can have catastrophal effects.

As, when turning with hard metal tools, the slides of the bed would be destroyed in a short time by the very sharp cuttings falling thereon with considerable force, the carriage guides must be arranged outside the turning range so that the cuttings can flow off freely into a suitably arranged collecting vessel over exchangeable hard sheet metal plates.

This invention relates to the construction of a high-speed lathe for hard metal and diamond tools which, when economically employing the hard metal and diamond turning tools, fulfills all the hereinafter mentioned conditions. The high speed lathe enables:

1. Unlimited utilization of the hard metal cutting tools and turning diamonds when working all hard and soft materials,
2. Accurate turning of all materials at the maximum cutting speed,
3. Rigid clamping and cutting of thick chips of all materials between dead centres and in the chuck at maximum speed.
4. The free passing off of the red-hot cuttings cut at an enormous speed over exchangeable hard sheet metal plates into a collector,
5. The safe working on the lathe and the observation of the turning process at the highest cutting speeds.

The high-speed lathe according to the invention avoids:—

1. In its construction all mechanical elements which might fail when maximum revolving speeds are employed,
2. The collecting of masses of cuttings within the range of the rotating piece of work and of the tool edge,
3. The destruction of the slides by the very sharp turning chips thrown on with considerable force, and the hitherto necessary complicated removing of the collected cuttings out of the range of the lathe,
4. The carrying along of the removed red-hot cutings by the piece of work rotating at an enormous speed and the formation of dangerous packs of cuttings and the catastrophal effect at maximum revolving speeds,
5. All danger to life when turning at maximum cutting speed.

An embodiment of the invention is illustrated by way of example in the accompanying drawings, in which.

Figure 1:
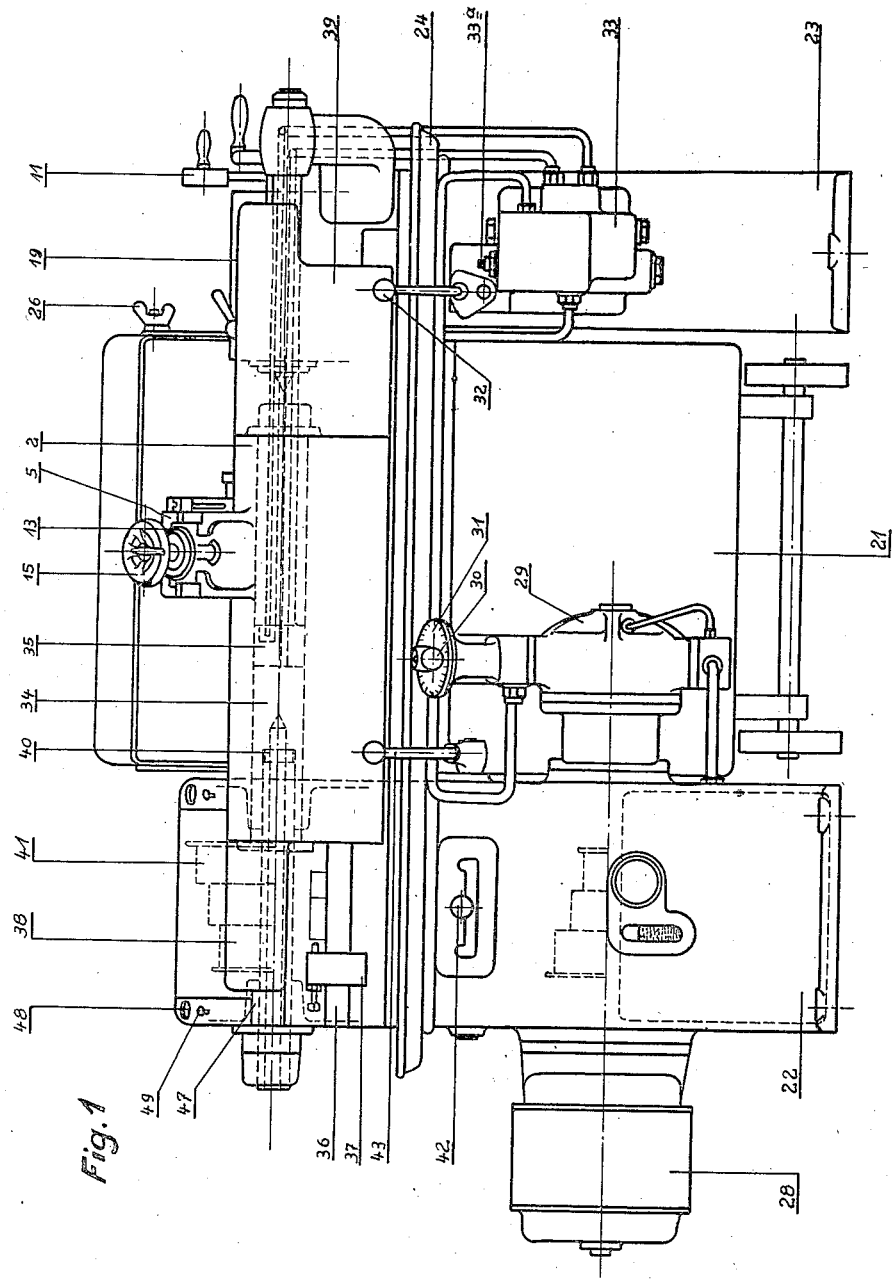
Fig. 1 shows in front elevation the high-speed lathe for taking cuttings.
Figure 2:
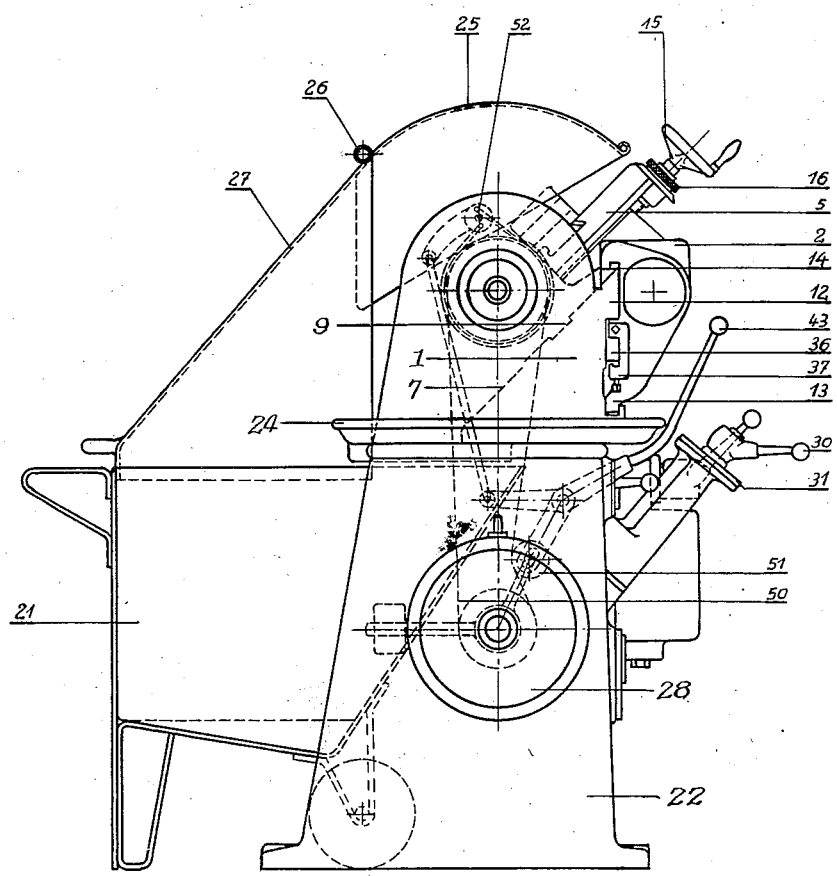
Figs. 2 and 3 are two end views of Fig. 1.
Figure 3:
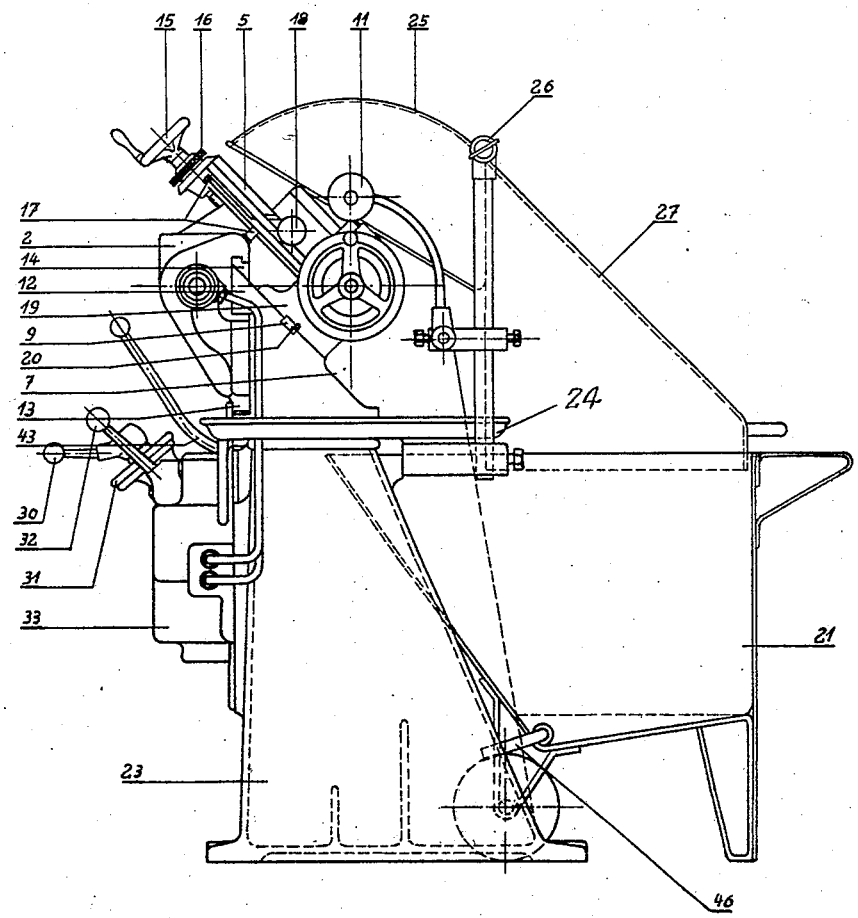
Figure 4:
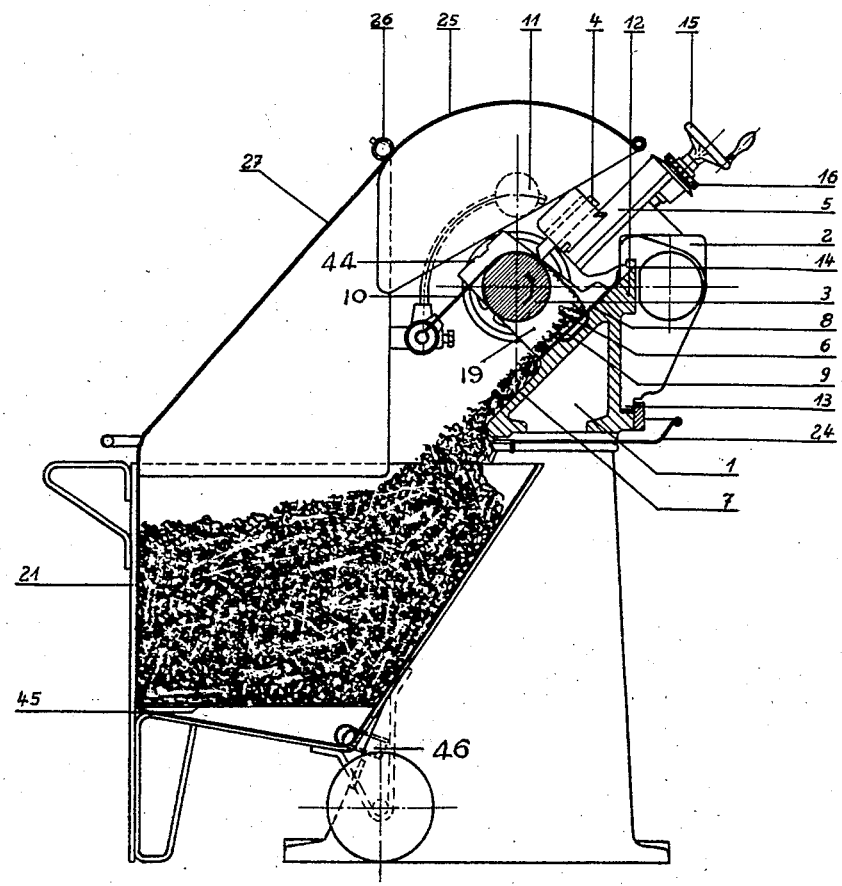
Fig. 4 is a cross section through the machine.

According to the invention the high-speed lathe is so constructed that it has a track 1 of triangular cross section for guiding off the chips, the bottom slide of saddle 2 being guided in known manner on the outer side of this track.

In order to attain a passing off of the cuttings in downward direction, the piece of work 3 must rotate in anticlockwise direction seen from the headstock end of the lathe and the tool 4 clamped with its cutting edge directed downwards. According to the invention the saddle 5 is arranged with the tool 4 parallel to the hypotenuse of the triangle of the track, that is inclined to the axis of rotation, so that the rolling off chip 6 comes into contact with the inclined surface 7 of the track approximately at right angles thereto, and the energy of its movement is checked by this surface. Thus, at the same time the breaking up of the chip 6 into small pieces is attained, which pieces then pass into the chip catcher. This latter is particularly important as the formation of long band-like chips is caused by the increasing wearing of the hard metal turning tool edge. In order to prevent the destruction of the back or bed surface 7 by the chips continually striking thereon, this surface is covered, between the head stock and the tail stock with exchangeable plates 8 of hard sheet metal, which also cover at the same time the tail stock bearing surface and the guide groove 9. To prevent chips from winding around the piece of work, a chip deflector 10 is provided which is held in position by a counterweight 11 which, when desired, can be swung out by the lever or arm on which it is adjustably mounted.

The guiding of the saddle slide is effected on the upper prism 12 as narrow guide, whereas the lower guide 13 is only constructed as counterholder. As, when turning in anticlockwise direction, the tool pressure is directed upwards, the guide prism 12 is arranged at the bottom and the tapered gib 14 at the top. Moreover, the guide prism 12 is likewise inclined to the axis of rotation corresponding to the position of the tool 4, so that a practical distribution of the bearing pressures is attained. The inclined position of the slide 5 relative to the axis of rotation reduces the distance between the tool 4 and the guide prism 12, so that only a short leverage for the chip pressure is produced. The inclined position of the slide also allows a clear view of the tool edge, makes the operation of the saddle convenient and enables the constructional height of the machine to be kept low. The saddle 5 is provided in known manner with a scale disc 16 for the cross feed 15 and can be turned against rigid abutments 17.

An adjustment 18 is also provided for the fine adjustment of the tool 4.

The tail stock 19 is also mounted on the inclined inner surface 7 of the triangular track. The tail stock may be arranged either stationary or movable. A groove 9 with tapered gib 20 on the tail stock serves for guiding. Consequently, the triangular track is utilized solely for carrying the bottom slide of saddle 2 and the tail stock 19. The rear side of the machine remains absolutely free, so that a suitable leading off of the chips is obtained.

A collecting vessel serves as chip catcher which is constructed as a truck 21, the front wall of which is inclined approximately at the same angle as the inner side 7 of the bed. The angles of inclination are so chosen that the chips slide out easily when emptying the track by tilting. The chip truck 21 is accommodated between the uprights 22, 23 carrying the bed, and consequently the truck is made of the same width as the turning length of the saddle. The chip truck 21 however extends in rearward direction considerably beyond the bed 1 and the uprights 22 and 23, so that a greater catching space is provided there for the chips. The trough 24 arranged around the uprights is intended to return any cooling water to the tank.

The high-speed lathe also has guards in the upper part of the machine. These are oscillatable on a stationary hinge. The upper guard 25 can preferably bear against the inclined saddle, but can also be held in any position by friction or clamping in the hinge 26. The rear guard 27 shuts off the space between the saddle 2 and the chip truck 21.

Owing to the inclined wall on the front side of the chip truck the truck only covers laterally the upper portion of the uprights. This presents the advantage, that the lower space, completely protected from chips and cooling water, can be employed for accommodating the driving mechanism for the lathe. As the driving shaft is accommodated in the lower portion of the upright 22, the driving motor 28 or the driving pulley can be arranged on the inner or outer side of the upright.

In the form of construction which will be hereinafter described the saddle 2 is provided with a hydraulic feed and an adjustable hydraulic gear 29 is preferably arranged on the inner side of the upright 22 so that the lever 30 for regulating the quantity of liquid supplied by the pump 29 is easily accessible from the operator's stand. This lever 30 indicates in each position the length of the feed stroke on a scale disc 31. On the opposite upright 23 a lever 32 and control valve 33 are arranged for engaging and disengaging the feed and also for changing the direction of feed and the accelerated movement, so that it is also easily accessible from the operator's stand. In this hydraulic feed gear the saddle carries the pressure cylinder 34, whereas the double acting plunger piston 35 is stationary. The advantage of this arrangement is that the machine can be made of short constructional length with a long saddle travel.

Owing to the hydraulic feed arrangement of the high speed lathe various conditions are fulfilled which are important for the complete utilization of the hard metal cutting tools. The elastic feed protects the cutting edge of the tool. If, for example, the feed pressure becomes too great, owing to the varying composition of the material, or if, for example owing to the high cutting speeds and the correspondingly rapid feeding movement, a so-called underhooking of the tool takes place, the safety valve 33a in the control valve 33 blows off and the feed movement is interrupted. Without this arrangement the tool would be destroyed every time.

The turning against a rigid abutment is also based on this principle. A bar 36 is arranged along the bed directly beside the narrow guide 12 of the slide 2, on which bar an abutment block 37 with fine adjustment can be clamped in any position. The block 37 is an abutment block against which the slide 2 runs. Between the abutment block 37 and the slide 2 any desired quantity of material can be placed on the bar 36, so that the different kinds of pieces of work can be produced with extreme accuracy in the abutment process. This relates to the cross adjustment 15 of the tool holder 5.

The slide 2 carries on both sides long guard plates 38 and 39, which completely cover the guide 12 when the slide is in each extreme position. Thus, the stationary piston rod 35 and the abutment bar 36 with end materials are protected against foreign bodies falling thereon.

The bearings 47 of the spindle in the head stock of the high speed lathe are provided with pressure oil flush lubrication for the maximum speeds of rotation. The pressure oil necessary for this purpose is taken from the feed circulation. A portion of the oil flowing back from the feed cylinder is deflected and conducted through the two main bearings 47. The necessary quantity can be regulated according to the discharge by a throttle valve 48 and inspection window 49 for each bearing. The oil flows back to the common collecting trough accommodated in the left upright 22.

The turning movement initiated by the driving pulley or driving motor 28 is transmitted to the spindle 40 by an endless belt 50. The spindle is absolutely free from the load of the belt, owing to the driven pulley 41 being mounted in the head stock casing. The spindle is driven by elastic buffers. The changing of the revolving speed is effected by a step pulley cooperating with a belt shifter 42 and oscillatable belt stretching pulley 51. By oscillating the stretching pulley by means of a lever 43 arranged on the point from which the machine is operated, the machine is stopped and started and a spindle brake operated, which consists of a brake band 52 adjustably arranged on the inner side of the driven step pulley 41. The step pulleys, which rotate at a high speed, are made of tough, light metal and dynamically weighted. The hollow spindle 40 allows, besides the clamping of the piece of work between the dead centres, the fitting of a wedge chuck for working rod material and the employment of a jaw chuck arrangement and special catch chuck for high revolving speeds.

In the tail stock 19 a roller bearing mandrel for high revolving speeds and adjustable guide bars 20 are located. Fitting surfaces 44 are provided for mounting different auxiliary apparatuses, such as a cross slide, slicing device, taper turning arrangement, charging device for magazine work and the like, which derive their drive, if necessary, from the front bed slide 2 through the intermediary of transmission rods. Provision is also made for hydraulic control for operating the tail stock 19 and the clamping device. The necessary pressure oil is supplied by the common pump 29.

If the high speed lathe is equipped with a wet turning arrangement, the right hand upright 23 is constructed as a cooling medium collecting vessel. For this purpose the chip truck 21 is provided with a double bottom, one of which is constructed as a strainer 45. The cooling water flowing from the chips through this strainer is conveyed to the collecting vessel 23 through a discharge pipe 46 and thus returned to the circulation of a circulating pump. If the chip truck 21 is pulled out from the machine, the discharge pipe 46 can be turned upwards as it is hingedly connected to the truck. By this means the drain water adhering to the chips is prevented from running out of the chip truck.

The rear guard may be provided with a window or an electric illumination fitted in the guard.

We claim:—

1. A lathe for high cutting speeds or high chip efficiencies, comprising in combination, a bed of triangular cross section, a tool slide arranged at an incline to the horizontal and guided on the outer side of said bed so that, when the workpiece rotates in clockwise direction, the chip cut therefrom comes into contact with the inner surface of said bed, its kinetic energy is destroyed and the chip broken up.

2. A chip-flow lathe for high chip efficiencies owing to high cutting speeds, comprising a bed beam having an inclined surface for discharging the chips, a tool slide movable over the outer side of the bed beam and located out of the range of downwardly moving chips, a tool carried by the slide and having its cutting edge directed downwardly, whereby chips from the work that rotates in a direction opposite the direction in which the chips fall, are directed downwardly and impinge the inclined wall of the bed beam in such manner that the kinetic energy of the chips is destroyed, and collection means for the chips.

3. A high speed lathe as specified in claim 2, comprising in combination with the bed beam, a tail stock on the inclined inner surface of said bed beam, hard flat sheet metal plates on the hypotenuse side of said bed beam adapted to protect the bed beam against the chips flung from the pieces of work extending entirely over said bed beam and covering the bearing surface of said tail stock and the guides and fixed to said guides.

4. A high speed lathe as specified in claim 2, comprising in combination with the uprights, a chip truck adapted to be run between said uprights having a receiving space for the chips extending beyond the rear side of the lathe, a false bottom strainer in said truck adapted to separate the cooling water from the chips, an oscillatable discharge pipe on said truck adapted to conduct off the cooling liquid collected in said truck, a collecting vessel adapted to catch the liquid discharged by said pipe, and a circulating pump connected to said vessel, said truck forming a unit with the lathe.

5. A high speed lathe as specified in claim 2, comprising in combination with the uprights, a chip truck adapted to be run between said uprights, hinged covers with lateral walls extending closing the turning space of the lathe to the top of said truck adapted to prevent the escapement of the chips and cooling medium.

6. In a high speed lathe as specified in claim 2, a front upper guard hingedly mounted on the lathe, and means for fixing by clamping said guard in any position according to the height of the operator's face.

7. A high speed lathe as specified in claim 2, comprising in combination with the bed beam, an inclined tail stock on said bed beam, and fitting surfaces on said tail stock adapted to carry auxiliary devices laterally of the longitudinal vertical plane of said bed beam.

8. A high speed lathe as specified in claim 2, comprising in combination with the upright, a driving shaft in one of said uprights, a driving motor on one side of said upright, and a feed regulation liquid pump on the other side of said upright.

9. In a high speed lathe attaining maximum capacity due to high cutting speeds, the combination with a guide, of a carriage supported on the guide out of the path of movement of chips, a tool holder on the carriage, an inverted cutting tool to cause the chips to flow downwardly with the work rotating in opposite directions, an abutment surface for the chips in a plane substantially at right angles to the direction of chip flow whereby the chips are broken and the kinetic energy of the chips destroyed and a collection receptacle for the chips.

OTTO ROTHENBERG.
WALTER MÖBIUS.
MALTE RITTER.
FRIEDRICH WILHELM BLOCK.